Sept. 27, 1966 R. ROCHEROLLES ETAL 3,275,937
STABILIZED RECEIVERS FOR SPACE VEHICLES
Filed March 14, 1962 2 Sheets-Sheet 1

3,275,937
STABILIZED RECEIVERS FOR SPACE VEHICLES
Raymond Rocherolles and Michel Bellenger, both of Paris, France, assignors to C.S.F.-Compagnie Generale de Telegraphie Sans Fil, a corporation of France
Filed Mar. 14, 1962, Ser. No. 179,672
Claims priority, application France, Mar. 20, 1961, 856,104
3 Claims. (Cl. 325—15)

The present invention relates to receiver systems adapted to be placed on missiles or other space vehicles in order to provide the desired observations with the required accuracy.

In order to investigate, in the upper atmosphere, the absorption spectrum lines in predetermined radio-frequency ranges, it is necessary to measure the energy delivered by the sun at the adjacent frequencies.

The spectrum lines to be measured have a width comprised between $10^{-7}$ and $10^{-8}$ of the frequency considered in the vicinity of 60,000 mc./s. Consequently, the stability of the receiver local oscillator should be higher than $10^{-8}$. It would therefore be necessary to have an initial source having a stability at least to within $10^{-9}$. Such a source, which may be a crystal or an atomic clock, cannot be easily placed on board a missile or satellite, on account of the bulkiness and complexity of such equipment.

The invention provides a receiver which is adapted to be placed on board the missile or space vehicle concerned and which makes it possible to make observations with the desired precision in spite of its lower stability.

The system according to the invention comprises a transmitter located on the ground and adapted to transmit at a fixed frequency and with high stability, for example, at half the frequency to be observed.

There is provided on the missile a receiver having two channels, one of which is tuned to the frequency of said transmitter and the other to the solar frequency to be observed.

The signals from the ground and from the sun are mixed with the output of the local oscillator and the instantaneous variations thereof will not appear at the output of the mixer.

The invention will be best understood from the following description and appended drawings, wherein.

Figure 1:
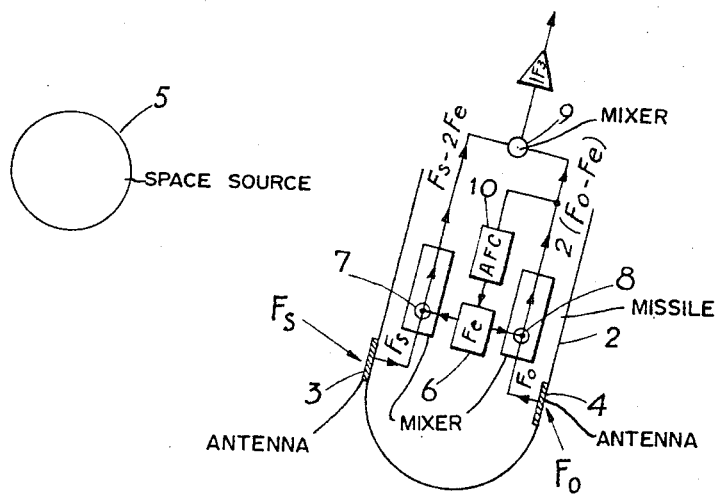
FIG. 1 illustrates diagrammatically one embodiment of the invention.
Figure 1:
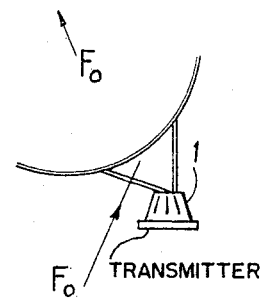

The transmitter 1, which is shown in FIG. 1, is located on the ground and transmits on a frequency $F_0$, with a very high stability, the transmitted frequency varying, for example, by not more than $10^{-9}$ this frequency.

The missile 2 is fitted with two antennas 3 and 4. Antenna 4 is directed in such a manner as to receive the signals at frequency $F_0$, while antenna 3 receives the signals at the frequency of the sun, represented at 5.

A local oscillator 6 placed on the missile operates at a frequency $F_e$. A mixer 7 mixes frequencies $F_s$ and $F_e$. A mixer 8 mixes frequencies $F_e$ and $F_0$. A mixer 9 is coupled to the outputs of mixers 7 and 8.

In order for the transmitted frequency $F_0$ not to be affected by atmospheric absorption, $F_0$ is selected substantially different from $F_s$.

At the output of mixer 7, frequency $F_s - nF_e$ is selected, and, at the output of mixer 8, frequency $n(F_0 - F_e)$ is selected, $n$ being an integer, for example $n=2$.

The output signal of mixer 9 has then the following frequency:

$$(F_s - nF_e) - n(F_0 - F_e) = F_s - nF_0$$

An automatic frequency control 10 acts on oscillator 6 in order to maintain constant the frequency thereof.

It appears that the operation results in quite an acceptable energy balance and accuracy, in spite of the frequency variations due to the Doppler effect.

At a specific example, assuming that the energy transmitted from ground is 10 w. at frequency $F_0=30,000$ mc./s., the following may be stated, starting from an energy level equal to 1 watt, and $n=2$.

|  | db |
|---|---|
| Transmitted energy | +10 |
| Losses due a path of 60 km. through space | −156 |
| Losses due to atmospheric absorption | −3 |
| Antenna gain at ground transmission | +55 |
| Antenna gain at reception (missile) | +5 |

The signal received by the missile from the ground transmitter will then be −90 db below one watt, i.e. $10^{-9}$ watts.

The Doppler effect has been so far disregarded and will be considered later. If it is desired to calculate the reception level at ground, of the signal reflected by the missile, considered as a radar target, the result will be in terms of 1 watt:

|  | db |
|---|---|
| Transmitted power | +10 |
| Antenna gain at ground | +110 |
| Atmosphere absorption during the out and back path (2×3 db) | −6 |
| Losses in the free space 2×60 km. | −312 |
| Reflector gain | +45 |
| Signal received | −155 |

With a noise factor of the order of 14 db and a passband of $10^5$ cycles, the noise level before detection is −140 db, and thus the signal-to-noise ratio is −15 to −20 db.

It is, besides, possible to gain 20 db by means of special phase-correlation systems.

The action of the Doppler effect may be estimated.

Figure 2:
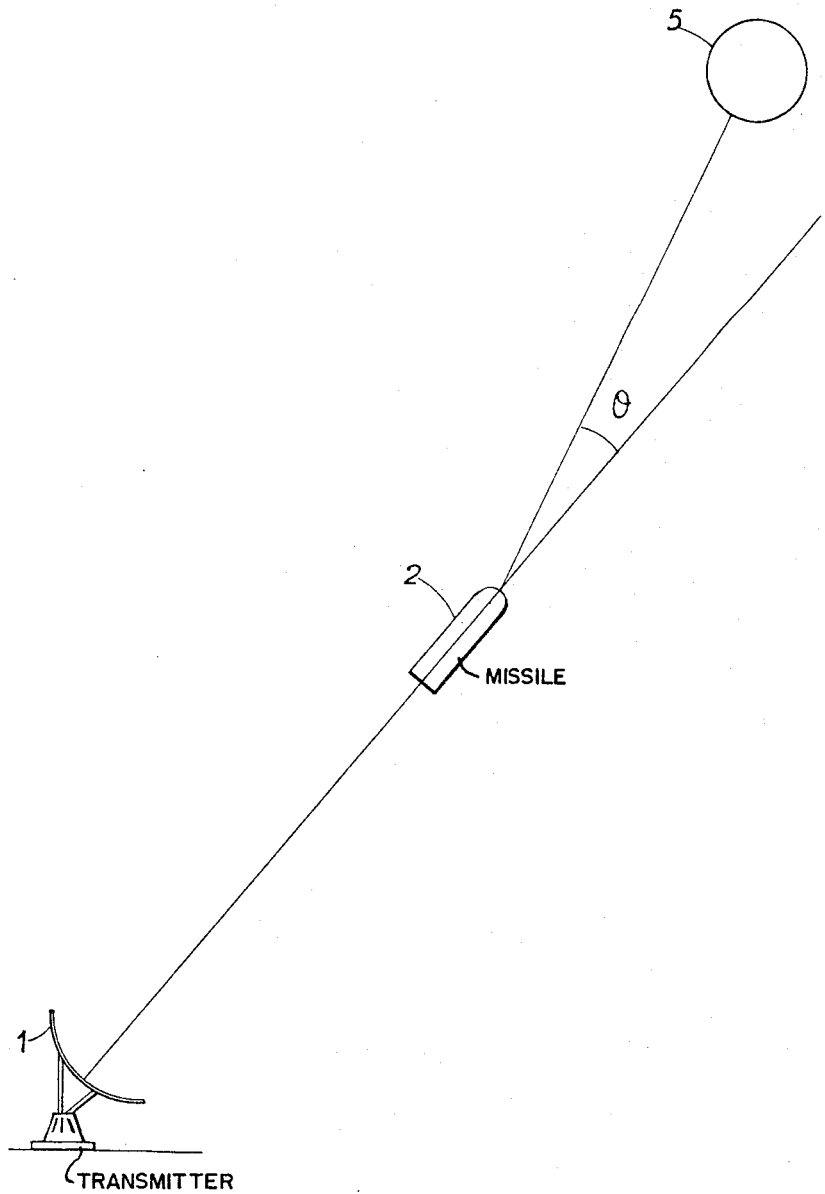
FIG. 2 shows the operating principle of the system shown in FIG. 1.

It will be assumed in the following that, as shown in FIG. 2, the missile is directed from the ground transmitter towards the sun and that its trajectory starts from the transmitter which means that its velocity is purely radial with respect to the latter.

Let $\theta$ be the angle between the trajectory of the engine with the direction of the sun with respect to the missile, $v$ being the speed of missile 2 and $c$ the velocity of light, then the frequency of the signals received by the missile from the sun is:

$$F'_s = F_s\left(1 + \frac{v}{c}\cos\theta\right)$$

and that of the signals from the ground:

$$F'_0 = F_0\left(1 - \frac{v}{c}\right)$$

Accordingly the output signal of the receiver mixer is:

$$F'_s - F'_0 = F_s\left(1 + \frac{v}{c}\cos\theta\right) - F_0\left(1 - \frac{v}{c}\right)$$

The terms $v/c$ and $v/c \cos\theta$ must be known with a sufficient accuracy for the measure to be effected with an overall precision to within $10^{-8}$ and consequently $v/c$ must be known to within $10^{-3}$ and $\theta$ to within a few degrees.

What we claim is:
1. A receiver for ultra-high frequency energy, adapted to be placed on a space vehicle, comprising: means for receiving from ground ultra-high frequency energy having a stabilized frequency $F_0$; means for receiving ultra- high frequency energy from a spatial source; a first, a second and a third mixer; a local oscillator having a frequency control input; an automatic frequency control, controlled by said stabilized frequency energy, and having an output connected to said frequency control input of said oscillator, said first and said second mixer being connected to said oscillator and having means for receiving respectively the wave energy incoming from said spatial source and said stabilized frequency energy for generating respective beats; and said third mixer for mixing said respective beats thus eliminating the frequency of said local oscillator and having an output for delivering the resulting beats.

2. A receiver for ultra-high frequency energy, adapted to be placed on a space vehicle, comprising: means for receiving ultra-high frequency energy having a stabilized frequency $F_o$; means for receiving ultra-high frequency energy from a spatial source in a frequency band centered about a frequency $F_s$; a first, a second and a third mixer, a local oscillator having a frequency control input; an automatic frequency control, controlled by said stabilized frequency energy, and having an output connected to said frequency control input of said oscillator, having a frequency $F_e$; said first and said second mixer being connected to said oscillator and having means for receiving respectively the wave energy incoming from said spatial source and said stabilized frequency energy for generating beats of respective frequencies $F_s-nF_e$ and $$n(F_o-F_e)$$

and said third mixer for mixing said respective beat frequencies, thus generating a beat frequency $F_s-nF_o$ and having an output for delivering the resulting beats.

3. A space vehicle comprising a receiver for ultra-high frequency energy, having means directed for receiving from ground ultra-high frequency energy having a stabilized frequency and means directed for receiving ultra-high frequency energy from a spatial source, a receiver coupled to said means and comprising a first, a second and a third mixer; a local oscillator having a frequency control input; an automatic frequency control, controlled by said stabilized frequency energy, and having an output connected to said frequency control input of said oscillator, said first and said second mixer being connected to said oscillator and having means for mixing respectively the wave incoming from the said spatial source and said stabilized energy for generating respective beats with said local oscillator and said third mixer for mixing said respective beat frequencies thus eliminating the frequency of said local oscillator and having on output for delivering the resulting beats.

References Cited by the Examiner

UNITED STATES PATENTS

| | | | |
|---|---|---|---|
| 2,691,726 | 10/1954 | Leypold | 325—307 |
| 2,692,332 | 10/1954 | Godbey | 325—435 |
| 2,773,179 | 12/1956 | Makow | 331—37 |
| 2,781,450 | 2/1957 | Ianouchewsky | 331—38 |
| 2,806,952 | 9/1957 | Makow | 331—39 |
| 2,864,956 | 12/1958 | Makow | 331—22 |
| 2,996,684 | 8/1961 | Wojciechowski | 331—38 |

DAVID G. REDINBAUGH, *Primary Examiner.*

KATHLEEN CLAFFY, *Examiner.*

J. W. CALDWELL, *Assistant Examiner.*